(12) United States Patent
Sargent et al.

(10) Patent No.: US 12,390,878 B2
(45) Date of Patent: Aug. 19, 2025

(54) SYSTEM AND METHOD FOR METAL FORMING AND LAYERING USING INDUCTIVE HEATING

(71) Applicant: LOCKHEED MARTIN CORPORATION, Bethesda, MD (US)

(72) Inventors: Kenneth Robert Sargent, Montverde, FL (US); William Kenneth Clark, Weirsdale, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 816 days.

(21) Appl. No.: 17/547,387

(22) Filed: Dec. 10, 2021

(65) Prior Publication Data

US 2023/0182229 A1    Jun. 15, 2023

(51) Int. Cl.

| | | |
|---|---|---|
| *B23K 13/01* | (2006.01) | |
| *B23K 13/08* | (2006.01) | |
| *B23K 35/32* | (2006.01) | |
| *B33Y 10/00* | (2015.01) | |
| *B33Y 30/00* | (2015.01) | |
| *B33Y 50/02* | (2015.01) | |
| *B33Y 70/00* | (2020.01) | |

(52) U.S. Cl.
CPC ............. *B23K 13/01* (2013.01); *B23K 13/08* (2013.01); *B23K 35/327* (2013.01); *B33Y 10/00* (2014.12); *B33Y 30/00* (2014.12); *B33Y 50/02* (2014.12); *B33Y 70/00* (2014.12)

(58) Field of Classification Search
CPC ......... B33Y 50/02; B33Y 10/00; B33Y 70/00; B33Y 70/10; B33Y 30/00; B23K 13/01; B23K 13/02; B23K 13/08; B23K 35/327; B29C 64/00; B29C 64/118; B29C 64/141; B29C 64/209; B29C 64/227; B29C 64/232; B29C 64/236; B29C 64/241; B29C 64/295; B29C 64/321; B29C 64/393
See application file for complete search history.

(56) References Cited

U.S. PATENT DOCUMENTS

| | | |
|---|---|---|
| 10,500,674 B2 | 12/2019 | Kandasamy et al. |
| 11,198,178 B2 | 12/2021 | Xu et al. |
| 2018/0361501 A1 | 12/2018 | Hardwick et al. |
| 2019/0091766 A1 | 3/2019 | Kasperchik et al. |
| 2019/0168300 A1 | 6/2019 | Gelbart |

FOREIGN PATENT DOCUMENTS

WO    WO-2020155540 A1 *    8/2020    ............ B22F 3/105

* cited by examiner

*Primary Examiner* — Hung D Nguyen
(74) *Attorney, Agent, or Firm* — Baker Botts L.L.P.

(57) ABSTRACT

The present disclosure is directed, in certain embodiments, a system for depositing material from a metal feedstock. The system includes a feedstock guide configured to guide a metal feedstock from a material feeder to extend beyond a terminal end of the feedstock guide. The system includes a ceramic collar disposed at the terminal end of the feedstock guide and configured to guide the metal feedstock extending from the terminal end of the feedstock guide to a deposition outlet of the ceramic collar. An induction coil disposed adjacent to the ceramic collar and configured to heat a portion of the metal feedstock within the ceramic collar, such that material of the metal feedstock can be deposited on a surface from the deposition end of the ceramic collar.

20 Claims, 7 Drawing Sheets

SYSTEM AND METHOD FOR METAL FORMING AND LAYERING USING INDUCTIVE HEATING

TECHNICAL FIELD OF THE DISCLOSED SUBJECT MATTER

The present disclosure generally relates to metal forming processes and systems, and more specifically to a system and method for metal forming and layering using inductive heating.

BACKGROUND OF THE DISCLOSED SUBJECT MATTER

In metal forming processes, metal from a source is generally heated sufficiently for it to be formed into a desired structure. In some cases, a large mechanical force may be applied to generate friction where a metal source contacts a substrate. This friction heats the metal source, and the metal source is deposited on the surface once it reaches a sufficiently high temperature. There exists a need for improved metal forming and layering processes and improved systems for performing these processes.

SUMMARY OF THE DISCLOSED SUBJECT MATTER

The purpose and advantages of the disclosed subject matter will be set forth in and are apparent from the description that follows, as well as will be learned by practice of the disclosed subject matter. Additional advantages of the disclosed subject matter will be realized and attained by the devices particularly pointed out in the written description and claims hereof, as well as from the appended drawings.

To achieve these and other advantages and in accordance with the purpose of the disclosed subject matter, as embodied and broadly described, the disclosed subject matter includes a feedstock guide configured to guide a metal feedstock from a material feeder to extend beyond a terminal end of the feedstock guide. A ceramic collar is disposed at the terminal end of the feedstock guide and configured to guide the metal feedstock extending from the terminal end of the feedstock guide to a deposition outlet of the ceramic collar. At least one induction coil is disposed adjacent to the ceramic collar and configured to heat a portion of the metal feedstock within the ceramic collar and allow material of the metal feedstock to be deposited on a surface from the deposition end of the ceramic collar.

Additionally, the system may include a drive system configured to rotate the metal feedstock when the at least one induction coil is powered. The material feeder may be configured to store the metal feedstock and release the metal feedstock at a controlled rate when the drive system rotates the metal feedstock. The system may include a movable table configured to hold a substrate on which the material of the metal feedstock is deposited. A control system may cause the movable table to move while the material of the metal feedstock is deposited.

Moreover, the system may include an infrared thermometer configured to measure a temperature of the heated portion of the metal feedstock. A control system may receive the temperature measured by the infrared thermometer and adjust the power provided to the induction coil based on a comparison of the temperature and a target temperature.

Furthermore, the metal feedstock may be a metal or alloy wire. For example, the material of the metal feedstock may be an alloy with a softening temperature of about 1500° F. or greater.

In accordance with another aspect of the disclosed subject matter, a material deposition system includes a feedstock guide configured to guide a metal feedstock from a material feeder to extend beyond a terminal end of the feedstock guide. A ceramic collar is disposed around the metal feedstock extending from the terminal end of the feedstock guide and extending at least partially around a plurality of ceramic bearings configured to guide the metal feedstock extending from the terminal end of the feedstock guide to a deposition outlet of the ceramic collar. At least one induction coil is disposed adjacent to the ceramic collar and configured to heat a portion of the metal feedstock surrounded by the ceramic bearings and allow material of the metal feedstock to be deposited on a surface from the deposition end of the ceramic collar Moreover, the system may include a drive system configured to rotate the metal feedstock when the at least one induction coil is powered. The material feeder may be configured to store the metal feedstock and release the metal feedstock at a controlled rate when the drive system rotates the metal feedstock. The system may include a movable table configured to hold a substrate on which the material of the metal feedstock is deposited. A control system may cause the movable table to move while the material of the metal feedstock is deposited.

Additionally, the system may include an infrared thermometer configured to measure a temperature of the heated portion of the metal feedstock. A control system may receive the temperature measured by the infrared thermometer and adjust the power provided to the induction coil based on a comparison of the temperature and a target temperature.

Furthermore, the metal feedstock may be a metal or alloy wire. For example, the material of the metal feedstock may be an alloy with a softening temperature of about 1500° F. or greater.

In accordance with another aspect of the disclosed subject matter, a method of depositing material from a metal feedstock includes steps of contacting metal feedstock extending from a deposition end of a ceramic collar to a surface, inductively heating a portion of the metal feedstock within the ceramic collar, and, while inductively heating the portion of the metal feedstock, rotating the metal feedstock, thereby depositing material of the metal feedstock on the surface.

Furthermore, the method may include a step of releasing the metal feedstock from a material feeder at a controlled rate while rotating the metal feedstock. The method may include a step of moving a table holding the surface while the material of the metal feedstock is deposited on the surface. The method may include a step of heating the portion of the metal feedstock within the ceramic collar by providing power to an induction coil positioned adjacent to the ceramic collar.

The method may include a step of measuring a temperature of the heated portion of the metal feedstock. The method may include a step of adjusting an amount of induction heating provided to the portion of the metal feedstock within the ceramic collar based on a comparison of the measured temperature and a target temperature.

Previous metal forming and layering technology suffers from various drawbacks and limitations, the recognition which are encompassed by this disclosure. For instance, this disclosure recognizes that components made of refractory materials (i.e., metals or alloys with very high softening temperatures) cannot be reliably formed using conventional material deposition systems. The temperature required to deposit these refractory materials may be too high, resulting in damage to the deposition system and/or a substrate on which the material is initially deposited. If a deposition system that employs high mechanical forces is used to deposit the refractory materials, the excessively high mechanical forces needed may damage the deposition system and/or a substrate on which the material is initially deposited. In some cases previous deposition technologies may not be capable of being adapted to withstand the temperatures and/or mechanical forces required to deposit the refractory materials. Even if such adaptation is possible, the resulting system may be prohibitively costly for practical applications. This disclosure also recognizes that if previous deposition approaches are attempted for these refractory materials, the deposited material is relatively low quality with uneven layers of the material deposited irregularly. These low quality deposited layers may not be suitable for their intended purpose, such that desired structures cannot be prepared from refractory materials using previous technology. In some cases, these limitations may be a crucial bottleneck in the preparation of components from refractory materials and the development of technologies using such components.

Technical advantages of certain embodiments of this disclosure may include one or more of the following. For example, this disclosure facilitates the layer-by-layer deposition of refractory materials (or other metals or alloys) using induction (e.g., inductive heating) to locally heat a metal feedstock near a deposition point. The system includes a ceramic structure (e.g., a ceramic collar and/or ceramic beads, also generally referred to as bearings herein) around the end of a metal feedstock. An induction coil is located on or near the ceramic structure. When the induction coil is powered, the portion of the metal feedstock within the ceramic structure is heated without significantly heating the ceramic structure itself. The metal feedstock receives the vast majority of the energy that inductively heats only the metal or alloy of the feedstock. This approach facilitates controlled heating of the metal feedstock near the point where deposition is performed without significant heating of other components of the system. Using this approach, the metal feedstock can be deposited with significantly less mechanical force applied to a deposition surface or substrate. As such, damage to the deposition system, the underlying surface/substrate, and any previously deposited layers is decreased or eliminated. Since less mechanical force is needed for deposition, the deposition system can also have a simpler construction (e.g., with less mechanical reinforcement) and lower cost. The induction-based deposition approach of this disclosure also allows components to be formed in a precise, layer-by-layer process using refractory materials that were previously inaccessible to previous deposition technologies. In certain embodiments, this approach provides unprecedented control of the structure of such components. For example, a refractory material, such as a rhenium alloy or titanium-aluminum alloy, can be deposited in a precise layer-by-layer fashion to achieve a desired structure.

BRIEF DESCRIPTION OF THE DRAWINGS

The subject matter of the application will be more readily understood from the following detailed description when read in conjunction with the accompanying drawings, in which.

DETAILED DESCRIPTION

As described above, previous material deposition technology suffers from various drawbacks and limitations, particularly with respect to the deposition of refractory materials. As used in this disclosure, a refractory material refers to a metal or alloy that needs to reach a very high temperature in order to become sufficiently soft for deposition. The temperature required to become sufficiently soft for deposition is referred to herein as a "softening temperature." A refractory material may have a softening temperature of greater than 1500° F., greater than 2000° F., greater than 3000° F., greater than 4000° F., or higher. Previous metal and alloy deposition technologies generally only function reliably with metal or alloys with softening temperatures of less than 1000° F. or lower. Previous deposition technology also tends to fail when the substrate has a lower softening temperature than the material being deposited. The new material deposition systems of this disclosure overcome this limitation by directing the majority of heating only to the metal feedstock, such that refractory materials can be deposited on substrates with lower softening temperatures than that of the deposited material.

Figure 1A:
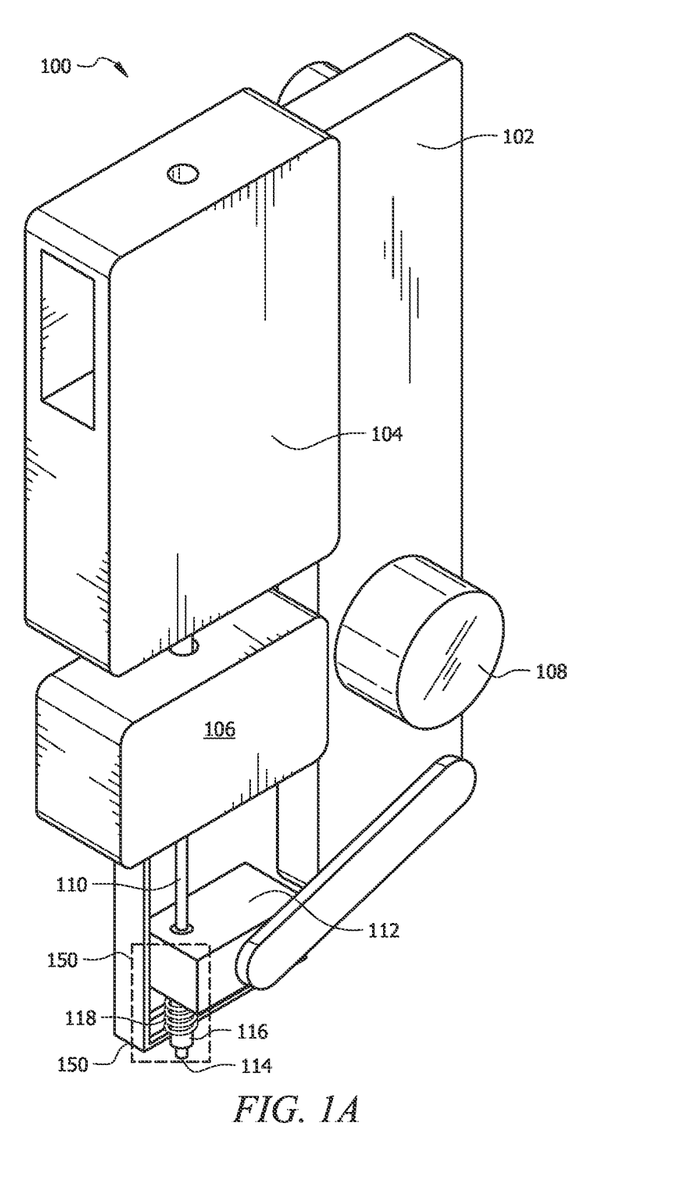
FIG. 1A is a diagram illustrating a material deposition system, in accordance with certain embodiments.
Figure 1B:
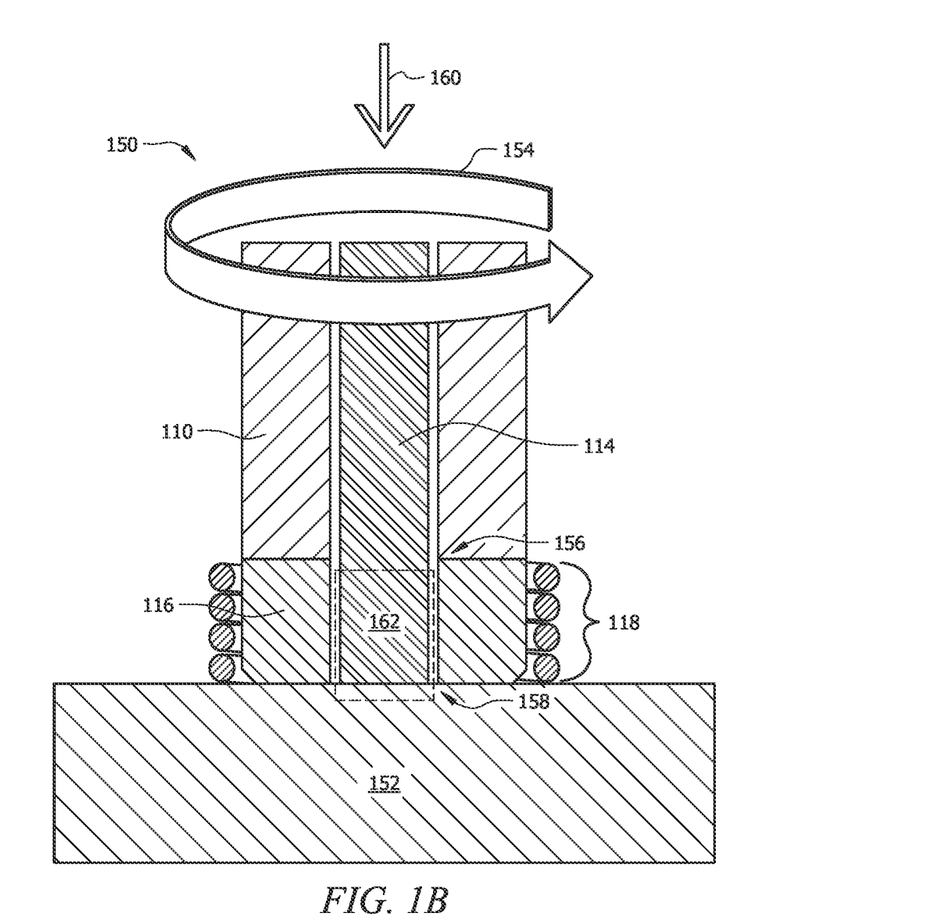
FIG. 1B is a diagram illustrating a region that includes a metal feedstock outlet portion of the system of FIG. 1A, in accordance with certain embodiments.
Figure 2A:
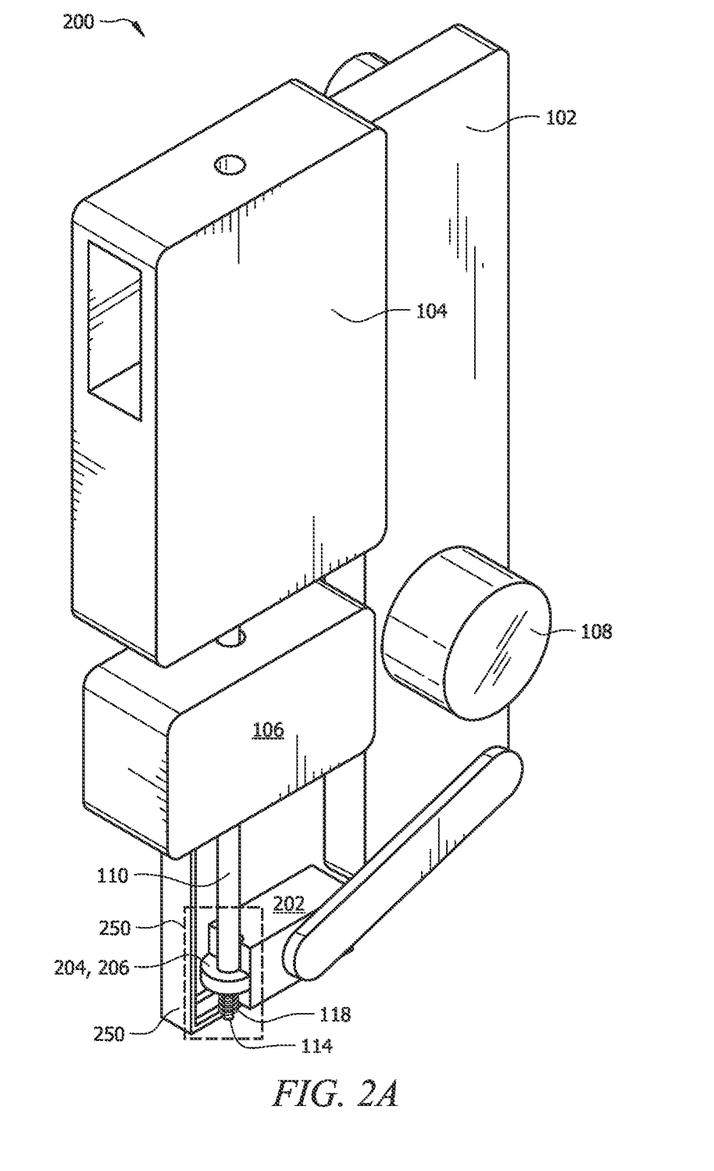
FIG. 2A is a diagram illustrating a material deposition system with ceramic bearings, in accordance with certain embodiments.
Figure 2B:
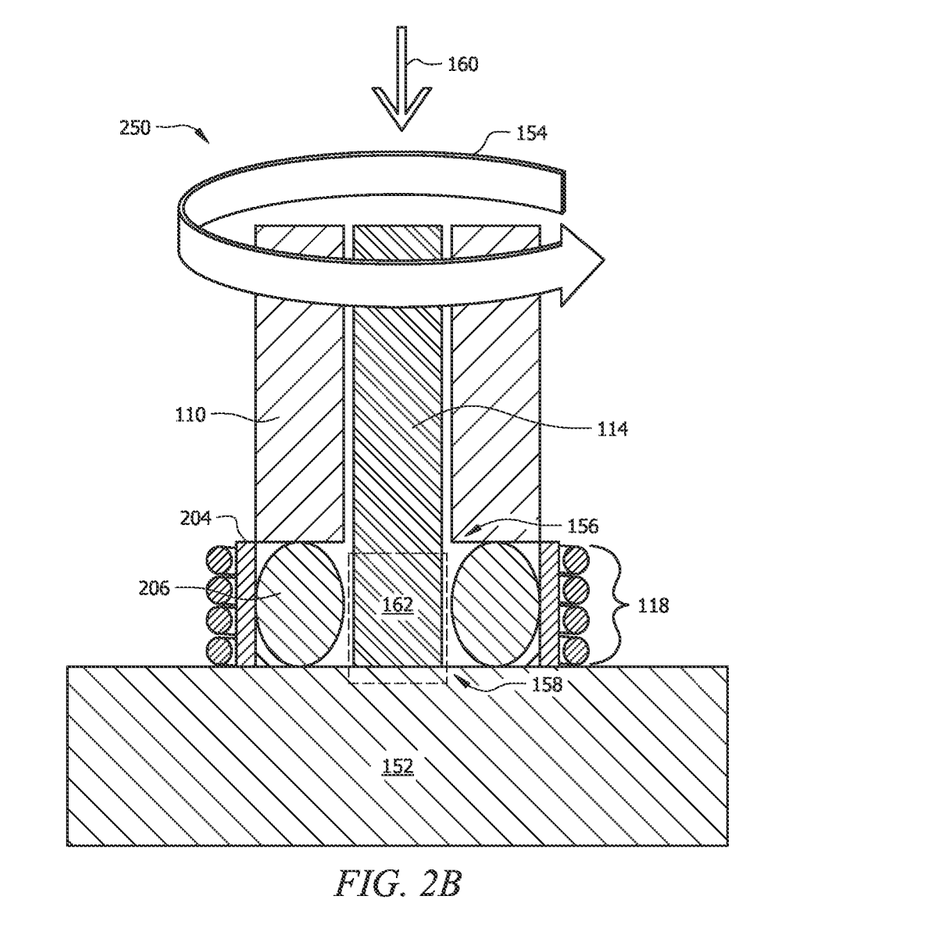
FIG. 2B is a diagram illustrating a region that includes a metal feedstock outlet portion of the system of FIG. 2A, in accordance with certain embodiments.
Figure 3:
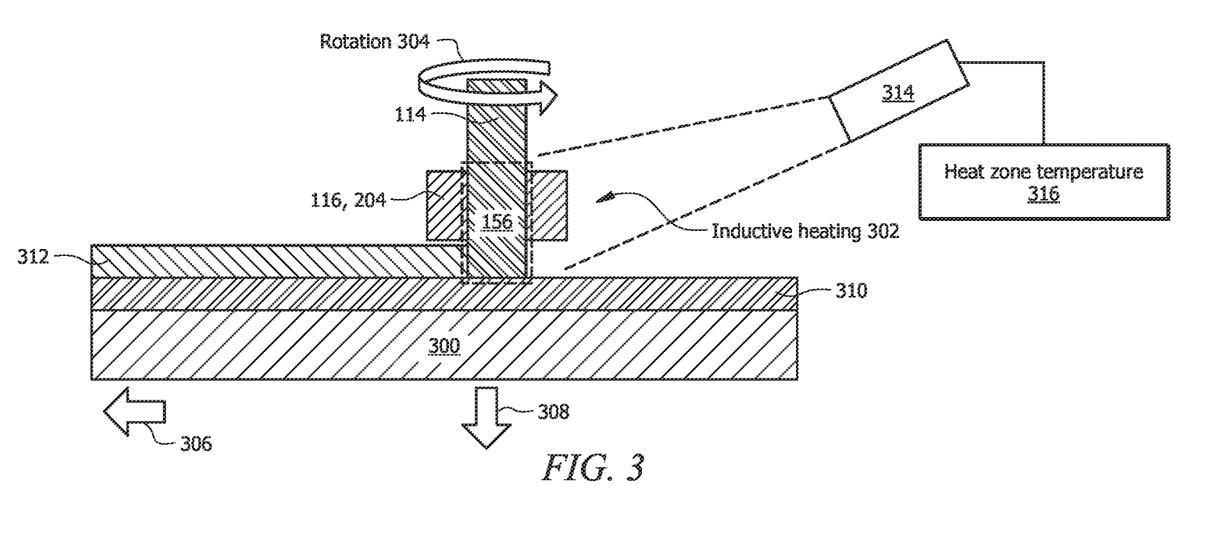
FIG. 3 is a diagram illustrating material deposition using a material deposition system of FIG. 1A or 2A, in accordance with certain embodiments.
Figure 4:
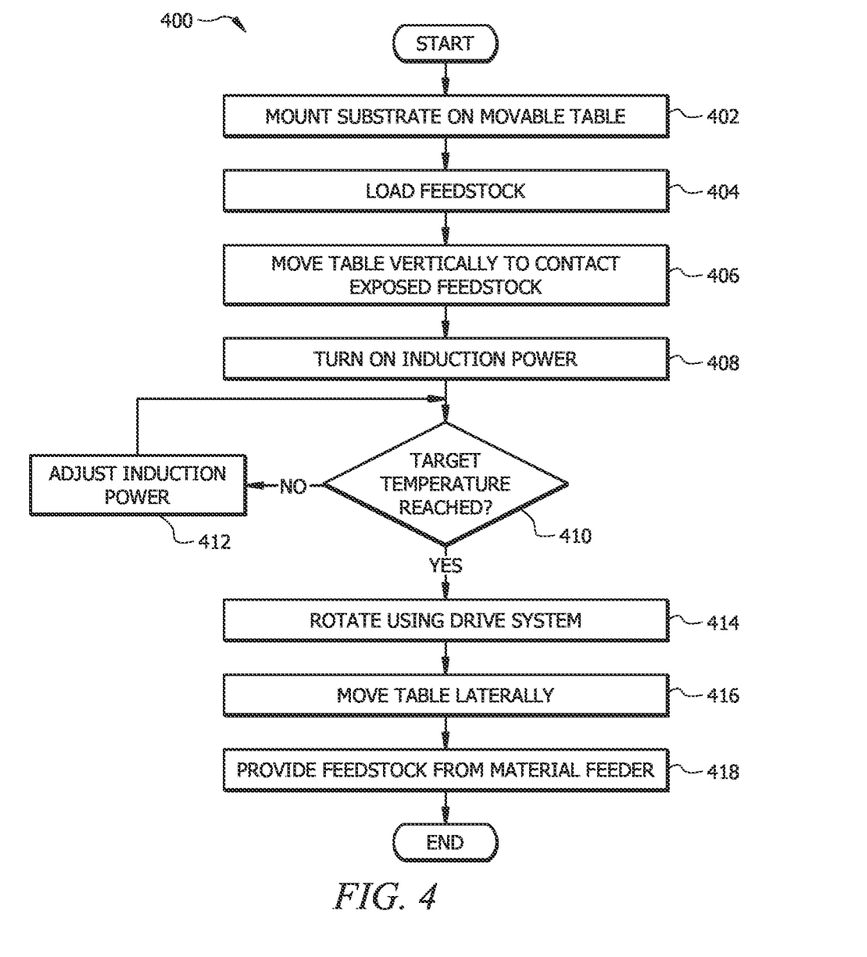
FIG. 4 is a flowchart illustrating a method of material deposition using a material deposition system of FIG. 1A or 2A, in accordance with certain embodiments.
Figure 5:
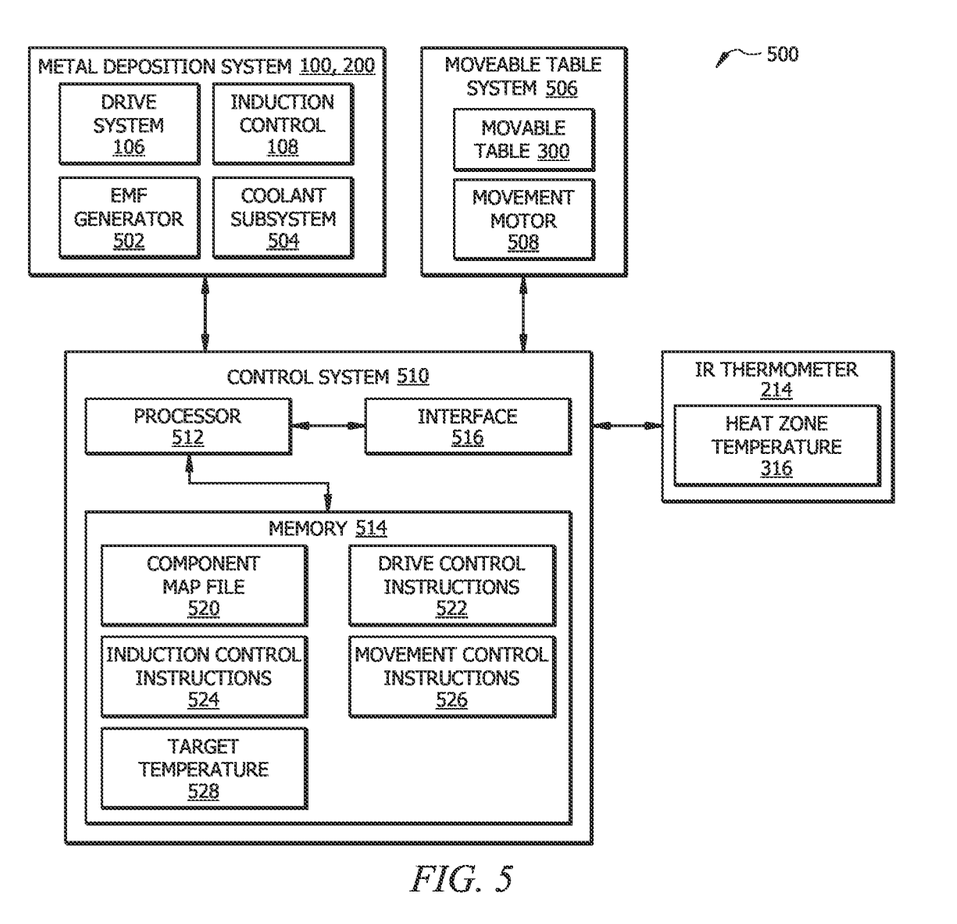
FIG. 5 is a diagram of a system for performing the method of FIG. 4, in accordance with certain embodiments.

Reference will now be made in detail to embodiments of the disclosed subject matter, an example of which is illustrated in the accompanying drawings. FIG. 1A illustrates an example material deposition system with a ceramic collar around the heated end of metal feedstock. FIG. 1B illustrates the heated end of the metal feedstock from FIG. 1A in greater detail. FIG. 2A illustrates an exemplary material deposition system with ceramic bearings around the heated end of metal feedstock. FIG. 2B illustrates the heated end of the metal feedstock from FIG. 2A in greater detail. FIG. 3 illustrates an exemplary material deposition process in progress. FIG. 4 is a flowchart of an exemplary material deposition process. FIG. 5 illustrates a system that includes the material deposition system of this disclosure. While these figures often depict or refer to depositing layers of materials, such as metals or alloys, it is to be understood that the present disclosure is not necessarily limited to the deposition of such layers, and the principles disclosed herein may have applicability to various types or forms of components, as understood by one of skill in the art.

Material Deposition Systems

FIGS. 1A and 1B illustrate an exemplary material deposition system 100 with a ceramic collar 116 around the end of a metal feedstock 114 and one or more induction coils 118 adjacent to the ceramic collar 116 that inductively heat the metal feedstock 114 in the ceramic collar 116. The material deposition system 100 includes a frame 102, a material feeder 104, a drive system 106, an induction controller 108, a feedstock guide 110, a ceramic guide block 112, the metal feedstock 114, a ceramic collar 116, and the induction coil(s) 118. Region 150 near the end of the feedstock guide 110 is shown in greater detail in FIG. 1B. Exemplary operation of the material deposition system 100 is described in greater detail with respect to FIGS. 3 and 4 below. A system that includes the material deposition system 100 as a subcomponent is described in greater detail with respect to FIG. 5.

The frame 102 holds components of the material deposition system 100 in position. The frame 102 may be mounted on another surface. For example, the frame 102 may be affixed to an industrial robot or to a computerized numerical control (CNC) machine. In some embodiments, such as is illustrated in FIG. 3, the frame 102 is stationary and a surface is moved below the material deposition system 100 to facilitate the deposition of continuous layers of material from the metal feedstock 114. However, in some embodiments, the frame 102 may be movable (e.g., mounted on a movable arm), such that the material deposition system 100 can move while material is deposited from the metal feedstock.

The material feeder 104 stores the metal feedstock 114 and releases the metal feedstock 114 during material deposition. For example, the material feeder 104 may be a housing configured to store material of the metal feedstock 114 and release the metal feedstock 114 at a controlled rate (e.g., at a predefined rate) during deposition. The material feeder 104 may drop the metal feedstock 114 into the feedstock guide 110 and spot weld the metal feedstock 114 provided into the feedstock guide 110 to form a continuous wire of metal feedstock 114 that extends through the feedstock guide 110. The metal feedstock 114 may be released when the drive system 106 rotates the metal feedstock 114 during deposition. The drive system 106, described below, may aid in controlling the rate at which the metal feedstock 114 is released.

The drive system 106 is configured, when turned on, to rotate the metal feedstock when the induction coil(s) 118 are powered. The drive system 106 may include a drill press that rotates or spins the metal feedstock 114 and presses the metal feedstock 114 onto a substrate or surface 152 during deposition. FIG. 1B illustrates rotation 154 of the metal feedstock 114 near a substrate/surface 152 on which material of the metal feedstock 114 is deposited. The substrate/surface 152 may be an initial surface on which material is deposited or a previous layer of the deposited material. The drive system 106 may cause the feedstock 114 to be released from the material feeder 104 during rotation. The drive system 106 may apply a downward force 160 during deposition. The drive system 106 may be controlled manually or by an integrated or separate control system (e.g., control system 510 illustrated in FIG. 5, described below).

The feedstock guide 110 is a strong hollow conduit configured to guide the metal feedstock 114 from the material feeder 104. Metal feedstock 114 extends beyond a terminal end 156 of the feedstock guide 110. The feedstock guide 110 may be made of a strong material, such as diamond or a diamond-containing material. The terminal end 156 of the feedstock guide 110 is configured to couple to the ceramic collar 116.

The induction controller 108 includes electronics and other components for powering the induction coil(s) 118. For example, the induction controller 108 may include a liquid coolant system (e.g., coolant system 504 of FIG. 5) that provides flow of cooled liquid coolant through the induction coil(s) 118 while the induction coil(s) 118 are powered. The induction controller 108 may include a current source (e.g., EMF generator 502 of FIG. 5) that passes an electrical current through, or "powers," the induction coil(s) 118. The induction controller 108 may be operated manually (e.g., using a knob, as illustrated in FIG. 1A) or through an integrated or separate control system (e.g., control system 510 illustrated in FIG. 5, described below).

The ceramic guide block 112 is a block of ceramic material with an opening to hold the feedstock guide 110 in place near or adjacent to the surface 152 where deposition is performed. The ceramic guide block 112 is made of a ceramic material to prevent the ceramic guide block 112 from being heated by the induction coil(s) 118. The ceramic guide block 112 may be coupled to the frame 102 or affixed to an industrial robot, a CNC machine, or the like. The ceramic guide block 112 may be stationary or movable.

The metal feedstock 114 is generally a piece of the material (e.g., a metal or alloy wire) that is deposited using the material deposition system 100. The metal feedstock 114 is typically a metal or alloy (e.g., aluminum, steel, etc.). In some embodiments, the metal feedstock 114 is a refractory material with a softening temperature of greater than 1500° F. In some embodiments, the metal feedstock 114 is a refractory material with a softening temperature of greater than 2000° F. In some embodiments, the metal feedstock 114 is a refractory material with a softening temperature of greater than 3000° F. In some embodiments, the metal feedstock 114 is a refractory material with a softening temperature of greater than 4000° F. As non-limiting examples, the metal feedstock 114 may be rhenium-containing alloy or a titanium-aluminum alloy. As described above, a softening temperature is the temperature at which a material softens sufficiently to perform deposition. For instance, a softening temperature may correspond to a temperature at which a material's strength decreases by 50%, 60%, 70%, 80%, 90% or more compared to its strength at room temperature. The metal feedstock 114 can generally have any cross-sectional shape. However, in some embodiments, the metal feedstock 114 has an approximately round cross section.

The ceramic collar 116 is a hollow piece of ceramic material that can accommodate the metal feedstock 114 passing therethrough. The ceramic collar 116 has collar a shape with a central void through which the metal feedstock 114 passes. The ceramic collar 116 is disposed at the terminal end 156 of the feedstock guide 110 and guides the metal feedstock 114 extending from the terminal end 156 to a deposition outlet 158 of the ceramic collar 116 (see FIG. 1B).

The induction coil(s) 118 may be hollow metallic (e.g., copper) tubes that are disposed adjacent to the ceramic collar 116 and configured, when powered by the induction controller 108, to heat a portion of the metal feedstock 114 within the ceramic collar 116. This inductive heating may occur primarily in the heat zone 162 illustrated in FIG. 1B that extends approximately the length of the induction coil(s) 118. This inductive heating allows the material of the metal feedstock 114 to be deposited on the substrate/surface 152 from the deposition end 158 of the ceramic collar 116. A liquid coolant may flow through the induction coil(s) 118 during inductive heating of the metal feedstock 114. In some cases, inductive heating may be combined with a downward mechanical force 160 provided by the drive system 106. For example, the heat zone 162 may be inductively heated to near the softening temperature of the material of the metal feedstock 114, and additional heating up to the softening temperature may be provided through friction between the metal feedstock 114 and the substrate/surface 152.

FIGS. 2A and 2B show another example material deposition system 200 in which the ceramic guide block 112 has a different configuration (see ceramic guide block 202) that has an integrated ceramic collar 204 that accommodates ceramic bearings 206, which guide the metal feedstock 114 near the substrate/surface 152. The material deposition system 200 includes the frame 102, the material feeder 104, the drive system 106, the induction controller 108, the feedstock guide 110, the feedstock 114, and the one or more induction coils 118 described above with respect to FIGS. 1A and 1B. The material deposition system 200 includes the different ceramic guide block 202 that has an integrated ceramic collar 204 within ceramic bearings 204 guide the metal feedstock 114. Similarly to FIG. 1B, FIG. 2B illustrates region 250 near the end of the feedstock guide 110 with ceramic collar 204 and bearings 206 shown in greater detail. Exemplary operation of the material deposition system 200 is described in greater detail with respect to FIGS. 3 and 4 below. A system that includes the material deposition system 200 as a subcomponent is described in greater detail with respect to FIG. 5.

As shown in FIG. 2B, the ceramic collar 204 and ceramic bearings 206 are positioned around the metal feedstock 114 that extends from the terminal end 156 of the feedstock guide 110. The ceramic collar 204 extends at least partially around the ceramic bearings 206, thereby holding the ceramic bearings 206 in place. The ceramic bearings 206 may be free to rotate such that the ceramic bearings 206 can guide the metal feedstock extending from the terminal end 156 of the feedstock guide to the deposition outlet 158 of the ceramic collar 204. The induction coil(s) 118 are disposed adjacent to (e.g., touching or within a few millimeters, centimeters, or the like) of the ceramic collar 204. When the induction coil(s) 118 are powered (see description of induction controller 108 with respect to FIGS. 1A and 1B above), a portion of the metal feedstock 114 surrounded by the ceramic bearings 206 is heated (e.g., in the heat zone 162). This inductive heating allows material of the metal feedstock 114 to be deposited on the substrate/surface 152 from the deposition end 158 of the ceramic collar 204.

Example of Operation of Material Deposition Systems

FIG. 3 illustrates an example operation of a material deposition system 100, 200. To deposit material from the metal feedstock 114, the metal feedstock 114 may be contacted to a substrate or previously deposited layer 310. For example, an end of the portion of the metal feedstock 114 that extends beyond the ceramic collar 116, 204 may contact the substrate or previously deposited layer 310. The substrate of previously deposited layer 310 may be the substrate/surface 152 of FIGS. 1B and 2B, described above, or a layer of the material from the metal feedstock 114 that was already deposited on such a substrate/surface 152.

Inductive heating 302 of the metal feedstock within the ceramic collar 116, 204 is then performed as described above with respect to FIGS. 1A,B and 2A,B. For example, the induction controller 108 may power the induction coil(s) 118 adjacent to the ceramic collar 116 (e.g., by providing current through the induction coil(s) 118) to heat the metal feedstock 114 in the heat zone 162. While preforming inductive heating 302 of the portion of the metal feedstock 114, rotation 304 of the metal feedstock 114 is performed, resulting in the deposition of material from the metal feedstock 114 on the substrate or previously deposited layer 310.

The drive system 106 may provide rotation 304 of the metal feedstock 114 (see FIGS. 1A,B, and 2A,B and corresponding description above). Rotation 304 may correspond to rotation 154 illustrated in FIGS. 1B and 2B. The metal feedstock 114 may also be released from the material feeder 104 while rotating the metal feedstock 114.

The substrate or previously deposited layer 310 may be held on a movable table 300. The movable table 300 can perform vertical movement 308 to adjust the distance between the substrate or previously deposited layer 310 and the metal feedstock 114. For example, the movable table 300 may be moved upwards toward the metal feedstock 114 to begin deposition. The movable table 300 can also perform lateral movements 310 in order to deposit the layer 312 of the material of the metal feedstock 114. In the example of FIG. 3, the movable table 300 is moving to the left to deposit layer 312 of the material of the metal feedstock 114. Layer 312 may be any thickness. For example, the layer 312 may be about $20,000^{th}$ of an inch in some cases. The thickness of the deposited layer 312 may be adjusted as appropriate to obtain a desired final structure. After the layer 312 is complete, the movable table 300 may move down and back to a starting lateral position to deposit a subsequent layer (not illustrated) on top of layer 312.

In some embodiments, an infrared thermometer 314 may be used to measure a heat zone temperature 316 corresponding to a temperature of the heat zone 162. An amount of inductive heating 302 provided to the portion of the metal feedstock 114 within the ceramic collar 116, 204 may be adjusted based on the measured heat zone temperature 316. For example, the power provided to the induction coil(s) may be adjusted using any appropriate feedback control strategy (e.g., proportional control proportional-integral, etc.) to maintain the heat zone temperature at or near a target temperature (e.g., target temperature 428 of FIG. 5).

The example operations described with respect to FIG. 3 may be coordinated by a user (e.g., by adjusting controllable rate of movement of the movable table 300, a rate of rotation 302 provided by drive system 106, an amount heating provided by the induction coil(s) 118, etc.) and/or automated using a control system (e.g., the control system 510 of FIG. 5).

FIG. 4 illustrates an example method 400 of operating a material deposition system 100, 200. The method 400 may begin at step 402, where a substrate 152 is mounted on a movable table 300. At step 404, the metal feedstock 114 is loaded into the material feeder 104 of the material deposition system 100. At step 406, the movable table 300 is moved vertically such that the metal feedstock 114 extending from the deposition end 158 of the ceramic collar 116, 204 contacts the substrate 152.

At step 408, the induction coil(s) 118 are powered (e.g., by passing a current through the induction coil(s) 118), resulting in a temperature increase in the heat zone 162. At step 410, a determination may be made of whether a target temperature (e.g., target temperature 528 of FIG. 5 is reached). For example, a heat zone temperature 316 may be measured with an infrared thermometer 314 and compared to the target temperature. If the heat zone temperature 316 is not within a threshold range of the target temperature, the induction power may be adjusted at step 412. For example, a current provided to the induction coil(s) 118 may be increased or decreased to either increase or decrease, respectively, the temperature in the heat zone 162.

When the target temperature is reached at step 410, the method 400 proceeds to step 414 where the metal feedstock is rotated. For example, the drive system 106 may be activated to rotate the metal feedstock 114 at a predefined rotation rate, resulting in deposition of the inductively heated metal feedstock 114 on the substrate 152. At step 416, the movable table 300 may be moved laterally (see lateral movement 306 of FIG. 3) to deposit a layer 312 of the material of the metal feedstock 114. At step 418, metal feedstock 114 is released from the material feeder 104 to facilitate continued deposition of the layer 312 of the material of the metal feedstock 114.

Example of Control System

FIG. 5 illustrates an exemplary system 500 that includes a material deposition system 100, 200, a movable table system 506, an infrared thermometer 314, and a control system 510. The material deposition system 100, 200 is described above with respect to FIGS. 1A-4. The material deposition system 100, 200 includes a controllable drive system 106 and induction controller 108. The induction controller 108 may include an EMF generator or current source 502 and coolant system 504. The EMF generator/current source 502 is used to power the induction coil(s) 118, and the coolant system 504 provides a flow of cooled coolant through the induction coil(s) 118 while the induction coil(s) 118 are powered. The control system 510 provides control signals (e.g., drive control instructions 522 and induction control instructions 524) for operating the drive system 106 and the induction controller 108.

The movable table system 506 includes the movable table 300 of FIG. 3 along with a movement motor 508. The movable table 300 holds a substrate 152 on which the material of the metal feedstock 114 is deposited. The movement motor 508 is any electromechanical motor that can cause movement (e.g., lateral, or horizontal, movement 306 and vertical movement 308) of the moveable table 300. The control system 510 provides control signals (e.g., movement control instructions 526) for operating the movement motor 508.

The infrared thermometer 314 measures a heat zone temperature 316 of the heated portion of the metal feedstock 114. The infrared thermometer 314 is in communication with the control system 510. The control system 510 receives the heat zone temperature 316 measured by the infrared thermometer 314 and adjusts the induction control instructions 524, such that an adjusted power (or current) is provided to the induction coil(s) 118 based on a comparison of the heat zone temperature 316 and a target temperature 528. For example, if the heat zone temperature 316 is less than the target temperature 528 (e.g., by at least a threshold value), the current provided to the induction coil(s) 118 (i.e., as indicated by the induction control instructions 524) is increased. If the heat zone temperature 316 is greater than the target temperature 528 (e.g., by at least a threshold value), the current provided to the induction coil(s) 118 (i.e., as indicated by the induction control instructions 524) is decreased.

The control system 510 includes a processor 512, a memory 514, and an interface 516. The processor 512 includes one or more processors. The processor 512 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 512 may be a programmable logic device, a microcontroller, a microprocessor, or any suitable combination of the preceding. The processor 512 is communicatively coupled to and in signal communication with the memory 514 and interface 516. The processor 512 may be 8-bit, 16-bit, 32-bit, 64-bit or of any other suitable architecture. The processor 512 may include an arithmetic logic unit (ALU) for performing arithmetic and logic operations, processor registers that supply operands to the ALU and store the results of ALU operations, and a control unit that fetches instructions from memory 514 and executes them by directing the coordinated operations of the ALU, registers, and other components.

The memory 514 is operable to store any data, instructions, logic, rules, or code operable to execute the functions of the system 500. For example, the memory may store a component map file 520, drive control instructions 522, induction control instructions 524, movement control instructions 526, and target temperature 528. The component map file 520 may be a three-dimensional representation of a component to be prepared by the system 500. For example, the component map file 520 may include a computer-aided design (CAD) representation of the component that is to be prepared using the material of the metal feedstock 114. The control system 510 may use the component map file 520 to determine appropriate drive control instructions 522, induction control instructions 524, movement control instructions 526, and target temperature 528 for preparing the component indicated by the component map file 520. The drive control instructions 522 indicate how the drive system 106 operates (e.g., to rotate and/or proved mechanic force) during deposition. The induction control instructions 524 provide instructions for powering the induction coil(s) 118 during deposition. The movement control instructions 526, when provided to the movement motor 508, cause the movable table 300 to move while the material of the metal feedstock 114 is deposited. The memory 514 includes one or more disks, tape drives, or solid-state drives, and may be used as an over-flow data storage device, to store programs when such programs are selected for execution, and to store instructions and data that are read during program execution. The memory 514 may be volatile or non-volatile and may comprise read-only memory (ROM), random-access memory (RAM), ternary content-addressable memory (TCAM), dynamic random-access memory (DRAM), and static random-access memory (SRAM).

The interface 516 is configured to enable wired and/or wireless communications. The interface 516 is configured to communicate data between the control system 510 and other components of the system 500, such as the material deposition system 100, 200, the movable table system 506, and/or the infrared thermometer 314. The interface 516 is an electronic circuit that is configured to enable communications between devices. For example, the interface 516 may include one or more serial ports (e.g., USB ports or the like) and/or parallel ports (e.g., any type of multi-pin port) for facilitating this communication. As a further example, the interface 516 may include a WIFI interface, a local area network (LAN) interface, a wide area network (WAN) interface, a modem, a switch, or a router. The processor 512 is configured to send and receive data using the interface 516. The interface 516 may be configured to use any suitable type of communication protocol as would be appreciated by one of ordinary skill in the art.

In sum, the systems and operations described herein may facilitate improved deposition of materials and particularly of refractory materials with relatively high softening temperatures. As a result, components can be prepared from and/or modified with refractory materials in a manner that was not possible using previous technology. Although primarily described as a process for preparing components, portions of the disclosed operations can be used to modify and/or repair an existing component. Since inductive heating is largely constrained to the portion of the metal feedstock 114 in the heated zone 162, a refractory material can be effectively deposited on substrates that have lower softening temperatures than that of the refractory material with little or no impact on the quality of the substrate (e.g., with little or no damage, softening, etc. of the substrate).

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. The term "approximate" refers to being within about 30%, 20%, 10%, 5%, or less of a given value or another measurable characteristic. For example, an approximately circular cross section of a metal feedstock may have a roundness of at least 0.7, 0.8, 0.9, 0.95, or greater.

While the disclosed subject matter is described herein in terms of certain embodiments, those skilled in the art will recognize that various modifications and improvements can be made to the disclosed subject matter without departing from the scope thereof. Additional features known in the art likewise can be incorporated. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A material deposition system, comprising:
   a feedstock guide comprising a plurality of ceramic bearings, the feedstock guide configured to guide a metal feedstock from a material feeder to extend beyond a terminal end of the feedstock guide;
   a ceramic collar disposed at the terminal end of the feedstock guide and configured to guide the metal feedstock extending from the terminal end of the feedstock guide to a deposition outlet of the ceramic collar; and
   at least one induction coil disposed adjacent to the ceramic collar and configured to:
   heat a portion of the metal feedstock surrounded by the ceramic bearings; and
   allow material of the metal feedstock to be deposited on a surface from the deposition end of the ceramic collar.

2. The system of claim 1, further comprising a drive system configured to rotate the metal feedstock when the at least one induction coil is powered.

3. The system of claim 2, wherein the material feeder is configured to store the metal feedstock and release the metal feedstock at a controlled rate when the drive system rotates the metal feedstock.

4. The system of claim 1, further comprising:
   a movable table configured to hold a substrate on which the material of the metal feedstock is deposited; and
   a control system configured to cause the movable table to move while the material of the metal feedstock is deposited.

5. The system of claim 1, further comprising an infrared thermometer configured to measure a temperature of the heated portion of the metal feedstock.

6. The system of claim 5, further comprising a control system configured to:
   receive the temperature measured by the infrared thermometer; and
   adjust power provided to the induction coil based on a comparison of the temperature and a target temperature.

7. The system of claim 1, wherein the metal feedstock is a metal or alloy wire.

8. The system of claim 1, wherein the material of the metal feedstock is an alloy with a softening temperature of 1500° F. or greater.

9. A material deposition system, comprising:
   a feedstock guide configured to guide a metal feedstock from a material feeder to extend beyond a terminal end of the feedstock guide;
   a ceramic guide comprising an integrated ceramic collar disposed around the metal feedstock extending from the terminal end of the feedstock guide and extending at least partially around a plurality of ceramic bearings configured to guide the metal feedstock extending from the terminal end of the feedstock guide to a deposition outlet of the ceramic collar; and
   at least one induction coil disposed adjacent to the ceramic collar and configured to:
   heat a portion of the metal feedstock surrounded by the ceramic bearings; and
   allow material of the metal feedstock to be deposited on a surface from the deposition end of the ceramic collar.

10. The system of claim 9, further comprising a drive system configured to rotate the metal feedstock when the at least one induction coil is powered.

11. The system of claim 10, wherein the material feeder is configured to store the metal feedstock and release the metal feedstock at a controlled rate when the drive system rotates the metal feedstock.

12. The system of claim 9, further comprising:
    a movable table configured to hold a substrate on which the material of the metal feedstock is deposited; and
    a control system configured to cause the movable table to move while the material of the metal feedstock is deposited.

13. The system of claim 9, further comprising:
an infrared thermometer configured to measure a temperature of the heated portion of the metal feedstock; and
a control system configured to:
receive the temperature measured by the infrared thermometer; and
adjust the power provided to the induction coil based on a comparison of the temperature and a target temperature.

14. The system of claim 9, wherein the metal feedstock is a metal or alloy wire.

15. The system of claim 9, wherein the material of the metal feedstock is an alloy with a softening temperature of 1500° F. or greater.

16. A method of depositing material from a metal feedstock, the method comprising:
forcing a metal feedstock through a ceramic collar comprising a plurality of ceramic bearings;
contacting the metal feedstock extending from a deposition end of a ceramic collar to a surface;
inductively heating a portion of the metal feedstock surrounded by the ceramic bearings; and
while inductively heating the portion of the metal feedstock, rotating the metal feedstock, thereby depositing material of the metal feedstock on the surface.

17. The method of claim 16, further comprising releasing the metal feedstock from a material feeder at a controlled rate while rotating the metal feedstock.

18. The method of claim 16, further comprising moving a table holding the surface while the material of the metal feedstock is deposited on the surface.

19. The method of claim 16, further comprising:
measuring a temperature of the heated portion of the metal feedstock; and
adjusting an amount of induction heating provided to the portion of the metal feedstock within the ceramic collar based on a comparison of the measured temperature and a target temperature.

20. The method of claim 16, further comprising heating the portion of the metal feedstock within the ceramic collar by providing power to an induction coil positioned adjacent to the ceramic collar.

* * * * *